United States Patent [19]

Schlagmüller et al.

[11] 3,967,597

[45] July 6, 1976

[54] ELECTROMAGNETICALLY ACTUATED FUEL INJECTION VALVE

[75] Inventors: Walter Schlagmüller, Schwieberdingen; Herbert Wagner, Bamberg, both of Germany

[73] Assignee: Robert Bosch G.m.b.H., Stuttgart, Germany

[22] Filed: Sept. 23, 1974

[21] Appl. No.: 508,719

[30] Foreign Application Priority Data

Oct. 3, 1973 Germany .......................... 2349584

[52] U.S. Cl. .......................... 123/32 JV; 239/533; 251/139

[51] Int. Cl. .......................... F16k 31/06; B05b 1/30

[58] Field of Search .................... 123/32 AE, 32 JV; 239/533; 251/139, 141; 285/382.7

[56] References Cited

UNITED STATES PATENTS

| | | | |
|---|---|---|---|
| 3,464,627 | 9/1969 | Huber | 123/32 AE |
| 3,593,924 | 7/1971 | Eckert | 239/533 |
| 3,625,477 | 12/1971 | Vogel | 251/141 |
| 3,662,987 | 5/1972 | Schlagmuller et al. | 251/139 |
| 3,717,305 | 2/1973 | Hedges | 239/533 |
| 3,817,456 | 6/1974 | Schlappkohl | 239/533 |

*Primary Examiner*—Wendell E. Burns
*Assistant Examiner*—James W. Cranson, Jr.
*Attorney, Agent, or Firm*—Edwin E. Greigg

[57] ABSTRACT

An electromagnetically actuatable fuel injection valve including a housing within which a magnetic core and winding are mounted along with an armature and a valve needle. The valve needle is provided at one end with an armature connection which fits within a bore of the armature. The armature connection is provided with a series of adjacent lands and grooves which are press-fitted with respect to the wall of the armature bore by a swaging tool. In this way a fixed and permanent bond is created between the valve needle and the armature.

3 Claims, 2 Drawing Figures

ELECTROMAGNETICALLY ACTUATED FUEL INJECTION VALVE

BACKGROUND OF THE INVENTION

The invention relates to an electromagnetically actuated fuel injection valve for timed, low pressure fuel injection systems of internal combustion engines employing injection into the induction manifold of the engine. The fuel injection valve includes a soft iron core, disposed within the valve housing, the latter being provided with a fixed magnetic winding and further includes a coaxial armature whose face is separated from the face of the soft iron core by an air gap. The fuel injection valve also includes a valve needle which is adapted to reciprocate within the housing and, more particularly, within the nozzle body of the valve, with one end thereof being fixedly held within a corresponding coaxial bore of the armature.

Known injection valves of the type described above are manufactured in large quantities, and, in this type of valve, the needle is threaded into the armature and secured against relative rotation by means of an adhesive material. However, this material has been known to be carried into the valve needle guide bushing, thus causing the needle to be seized therein.

OBJECT AND SUMMARY OF THE INVENTION

It is an object of the invention to provide an improved fuel injection valve of the known type. More specifically, it is an object of the invention to provide a connection between the valve needle and the armature which lacks the above mentioned disadvantages of the known connections and which is also suitable for mass production.

It is another object of the invention to provide a method for producing the improved fuel injection valve.

Thus, according to the invention, the foregoing objects are attained by providing the upper extremity of the valve body with a series of annular ribs that are spaced from one another by undercut areas or grooves, said valve body being subsequently assembled by a press-fit within a bore in a magnetic armature of the valve.

An advantageous method of producing the connection between the needle and the armature provides that the valve needle is temporarily placed in a holding fixture and that an armature with a central bore is placed over the top of the valve needle. The diameter of the outer cylindrical surface of the armature is slightly larger in the region adjacent to the top of the valve needle than elsewhere. Subsequently, a swaging ring is placed over the armature and is drawn in the direction of the longitudinal axis of the assembly. This operation reduces the outside diameter of the armature to equal the inside diameter of the ring, thereby also decreasing the interior bore diameter and forcing the displaced armature material partially into the annular undercut areas or grooves of the valve needle.

Another advantageous embodiment of the injection valve according to the invention provides the valve needle with one or more flattened areas in its outer surface capable of permitting fuel flow longitudinally thereof through the channel formed between the needle and the armature in the press-fit region.

The invention will be better understood as well as further objects and advantages become more apparent from the ensuing detailed specification and exemplary embodiment taken in conjunction with the drawing.

BRIEF DESCRIPTION OF THE DRAWING

The drawing represents an exemplary embodiment of the invention as applied to an injection valve using longitudinal stroke metering.

DESCRIPTION OF THE PREFERRED EMBODIMENTS

Figure 1:
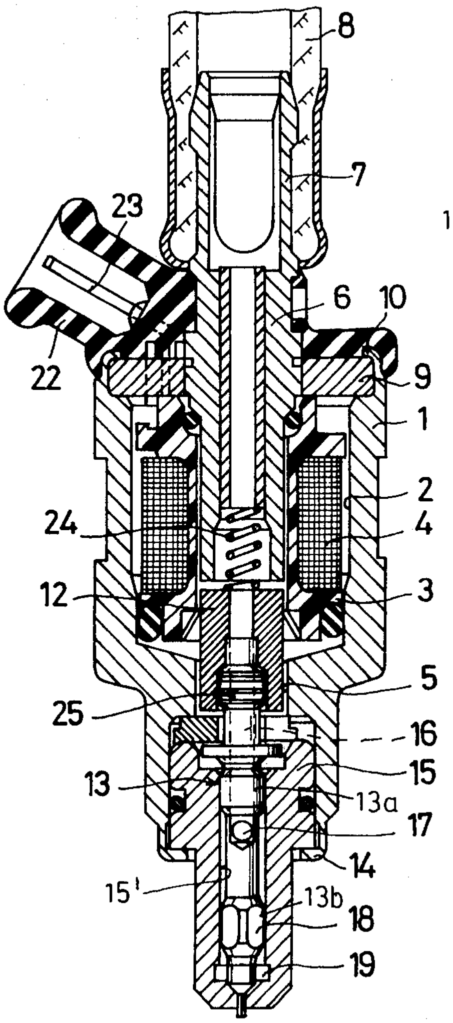
FIG. 1 is an axial section of the injection valve according to the invention.

The injection valve shown in FIG. 1 has a steel housing containing a central bore 2 for receiving the magnetic winding assembly including the winding. The bore 2 is continued in a substantially narrower, coaxial bore 5. Coaxial with and located within the magnetic winding assembly 3 is a soft iron magnet core 6 which forms a boss 7, penetrating the housing 1 and intended to be coupled to a fuel line 8 as shown. The soft iron magnet core 6 includes a flange 9 which also serves as a magnetic flux conductor to the housing to which it is fastened by a crimped rim 10 of the housing 1. Coaxial with and in juxtaposition to the soft iron core 6 is an armature 12 which is assembled by a press-fit connection with a valve needle 13. The valve needle slides longitudinally within a bore 15′ of a nozzle body 15 which is held in a reduced terminal portion of the housing 1 by a crimped rim 14. The valve needle is provided with lands 13*a* and 13*b* for guiding the valve needle during its longitudinal sliding movement within the bore 15′. The valve needle is also provided with an axial bore 16, indicated by broken lines, which intersects with a transverse bore 17. Fuel supplied through the axial bore 16 flows radially into the nozzle body through the transverse bore 17, thence through longitudinal grooves 18 which are ground in the front part of the land 13*b* of the valve needle body, and then into the annular space 19 immediately adjacent to the valve seat of the valve needle.

The magnetic winding 4 may be electrically connected to an electric controller (not shown) by means of the connector pin 23 located in a molded-on plastic part 22. When the winding 4 receives a sufficient amount of excitation current from the controller, the armature 12 and the valve needle 13 can be attracted to the soft iron core 6 in opposition to the restoring force of the central closure spring 24.

The press-fit armature connection, indicated generally as 25, which serves as the positive operational connection between the valve needle 13 and the armature 12 is formed by a series of bulges or lands 26 spaced apart by grooves 32. These lands and grooves are formed at the appropriate needle end 27 which cooperates with the wall 28 of a bore 29 that is provided within the armature 12, all of which will be better understood by referring to FIG. 2.

Figure 2:
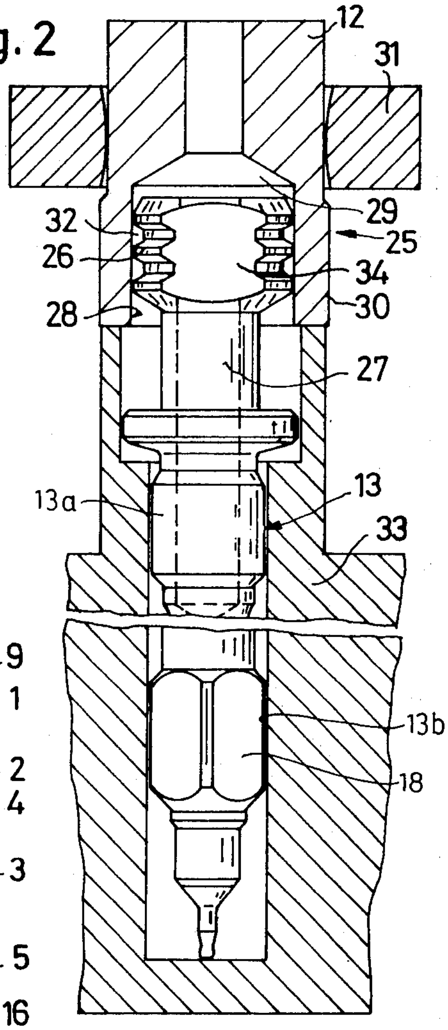
FIG. 2 depicts the valve needle and the armature in a supporting jig just prior to the swaging operation.

In FIG. 2 the armature is shown as including an enlarged bore 29 into which the upper portion of the needle is positioned preparatory for the assembly operation. During assembly of the structure, a swaging ring 31 is drawn over the outer surface 30 of the armature 12 to reduce the inside diameter of the bore 29. In this process, the substantially softer armature material is pressed into the annular grooves 32 of the valve needle which produces a fixed, positive, operational connection between the valve needle and the armature. During this step of the manufacturing process, the valve needle 13 is located within a supporting jig 33.

In another preferred embodiment of the invention, the flow of fuel within the valve takes place over one or more flattened portions 34 above the region 27 of the valve needle 13 as shown in FIG. 2 instead of through bores 16 and 17 within the body of the valve needle as shown in FIG. 1.

It is to be understood, of course, that the assembly of the armature with the needle is conducted in such a manner that the swaging operation will not restrict flow of fuel in the manner described.

What is claimed is:

1. An electromagnetically actuatable fuel injection valve, comprising:

a. a housing;

b. a magnetic core, affixed coaxially to and within the housing;

c. a magnetic winding, fixedly surrounding said magnetic core within said housing;

d. a magnetic armature, movably disposed within said housing, coaxial with said magnetic core and separated therefrom by an air gap, said magnetic armature being provided with a central, longitudinal bore; and e. a valve needle, disposed and guided within a bore of said housing, coaxial with said armature and said core, said valve needle being provided at one of its ends with a series of generally parallel lands and interposed grooves, said end being received within the bore of the armature so that said series of lands and grooves cooperate with the inner wall of the bore to form a press-fit connection of the valve needle and armature, and at the other of its ends with at least one groove formed in its outer surface which establishes a passage between that valve needle and the housing bore for the flow of fuel through the housing bore.

2. A fuel injection valve as defined in claim 1, wherein said armature includes a channel communicating with the central longitudinal bore within the armature, and said valve needle is provided with at least one flattened area at said end where said lands and grooves are provided, said at least one flattened area forming a passage between said valve needle and said central longitudinal bore of said armature, whereby fuel may flow from said channel through said passage.

3. A method for assembling a valve needle of a fuel injection valve to the armature of the valve, comprising the steps of:

a. providing one end of a valve needle with a series of lands and interposed grooves;

b. placing the valve needle in a holding jig;

c. placing a centrally bored armature over the end of the valve needle provided with the series of lands and interposed grooves; and d. drawing a swaging ring over the longitudinal extent of the armature, whereby displaced material from the inside wall of the bore in the armature is partly pressed into the grooves in said valve needle, creating a fixed, permanent operational bond.

* * * * *